United States Patent [19]

Kobayashi

[11] Patent Number: 4,958,301

[45] Date of Patent: Sep. 18, 1990

[54] METHOD OF AND APPARATUS FOR CONVERTING ATTRIBUTES OF DISPLAY DATA INTO DESIRED COLORS IN ACCORDANCE WITH RELATION

[75] Inventor: Hironobu Kobayashi, Tokyo, Japan

[73] Assignee: Kabushiki Kaisha Toshiba, Kawasaki, Japan

[21] Appl. No.: 330,481

[22] Filed: Mar. 30, 1989

[30] Foreign Application Priority Data

Mar. 30, 1988 [JP] Japan ................................. 63-74533

[51] Int. Cl.$^5$ ............................................. G06F 3/153
[52] U.S. Cl. .................................. 364/521; 340/703; 358/80
[58] Field of Search .............................. 358/22, 80–82, 358/169, 213.28, 455–460; 340/701, 703, 747, 790, 793; 364/518, 521; 382/17, 47

[56] References Cited

U.S. PATENT DOCUMENTS

| | | | |
|---|---|---|---|
| 4,509,043 | 4/1985 | Mossaides | 340/793 X |
| 4,580,135 | 4/1986 | Kummer et al. | 340/703 X |
| 4,689,669 | 8/1987 | Moshino et al. | 340/701 X |
| 4,843,379 | 6/1989 | Stansfield | 340/703 X |
| 4,857,909 | 8/1989 | Mizushima | 340/703 X |
| 4,881,067 | 11/1989 | Watanabe et al. | 364/518 X |
| 4,901,258 | 2/1990 | Akiyama | 358/80 X |
| 4,907,288 | 3/1990 | Shimoni | 358/169 X |

Primary Examiner—David L. Clark
Attorney, Agent, or Firm—Cushman, Darby & Cushman

[57] ABSTRACT

An apparatus for displaying display data without color competition includes a memory for storing the display data, attributes being assigned to portions of the display data in units of pixels, a controller for obtaining, in response to an input change instruction, a relation between the display data portions and a size of an area of each display data portion, and for determining display code data in accordance with the relation and the sizes, and a display unit for reading out the display data from the memory and displaying the display data with colors determined in accordance with the display code data.

22 Claims, 5 Drawing Sheets

|   | 0 | 1 | 2 | 3 | 4 |   | 14 | 15 |
|---|---|---|---|---|---|---|---|---|
| 0 | $M_0$ | $N_{0,1}$ | $N_{0,2}$ | $N_{0,3}$ | $N_{0,4}$ |   | $N_{0,14}$ | $N_{0,15}$ |
| 1 | $M_1$ |   | $N_{1,2}$ | $N_{1,3}$ | $N_{1,4}$ |   | $N_{1,14}$ | $N_{1,15}$ |
| 2 | $M_2$ |   |   | $N_{2,3}$ | $N_{2,4}$ |   | $N_{2,14}$ |   |
| 3 | $M_3$ |   |   |   | $N_{3,4}$ |   |   |   |
| 4 | $M_4$ |   |   |   |   |   |   |   |
|   |   |   |   |   |   |   |   |   |
| 14 | $M_{14}$ |   |   |   |   |   |   | $N_{14,15}$ |
| 15 | $M_{15}$ |   |   |   |   |   |   |   |

FIG. 5

METHOD OF AND APPARATUS FOR CONVERTING ATTRIBUTES OF DISPLAY DATA INTO DESIRED COLORS IN ACCORDANCE WITH RELATION

BACKGROUND OF THE INVENTION

1. Field of the Invention

The present invention relates to a method of and an apparatus for converting attributes of display data into desired colors in accordance with a relation between portions of the display data and sizes of the display data portions, thereby displaying the data without modifying an application program.

2. Description of the Related Art

With recent development in computer techniques, advanced functions such as graphic display, multi-color display, and multi-window display are realized in an application program in order to establish a better man-machine interface. A plurality of color palettes are used in such displays. Display data has an attribute for designating a color palette to be used and is displayed on a color display monitor in accordance with a color set in the color palette. That is, many currently-available application programs are designed for a color CRT.

Recently, a lap-top computer has been developed which can be conveniently carried by a user. In such a computer, a flat panel display such as an LCD (Liquid Crystal Display) or a PDP (Plasma Display Panel) is generally used as a display device. These display devices are of a mono-color type in which, for example, data can be displayed by only four colors, i.e., four gradation levels by a hardware limitation of four palettes. For this reason, if a commercially-available application program is directly loaded into the lap-top computer without any modification, color competition occurs to disable discrimination of color boundaries.

SUMMARY OF THE INVENTION

In consideration of the above situation, an object of the present invention is to provide an apparatus and a method capable of displaying in one frame display data while preventing color competition without the need for changing an application program.

In order to achieve the above object, the present invention provides an apparatus comprising a memory for storing display data, each portion of the display data having an attribute; a controller for obtaining, in response to an input change instruction, a relation between the display data portions and a size of an area of each display data portion, and for determining display code data corresponding to an attribute of each display data portion sequentially from the display data portion having the second largest area size in accordance with the relation, and a display unit for reading out the display data from the memory, converting the attributes of the display data to the codes of the display code data, and displaying the display data in accordance with the converted codes.

In order to achieve the above object, the present invention also provides a method comprising the steps of obtaining a relation between the plurality of display data to be displayed in one frame and a size of an area of each display data in response to a change instruction, each of the plurality data having an attribute representing a color to be used; determining a display code corresponding to an attribute of each display data sequentially from display data having the second largest area size; and displaying the plurality of display data in accordance with the determined codes.

As described above, according to the present invention, a code change control routine in an operating system (OS) can be started during execution of an application program by operating predetermined keys. Therefore, at an arbitrary timing during the execution of the application program, an attribute of display data can be converted into a desired code in accordance with a relation between the display data, i.e., a displayed gradation level can be changed. In this manner, a color display device application program can be executed in a computer having a monochromatic display without any difficulty.

BRIEF DESCRIPTION OF THE DRAWINGS

FIG. 5 is a view describing a relation between attributes of display data; and

DETAILED DESCRIPTION OF THE PREFERRED EMBODIMENTS

An attribute conversion apparatus according to the present invention will be described in detail below with reference to the accompanying drawings.

Figure 1:
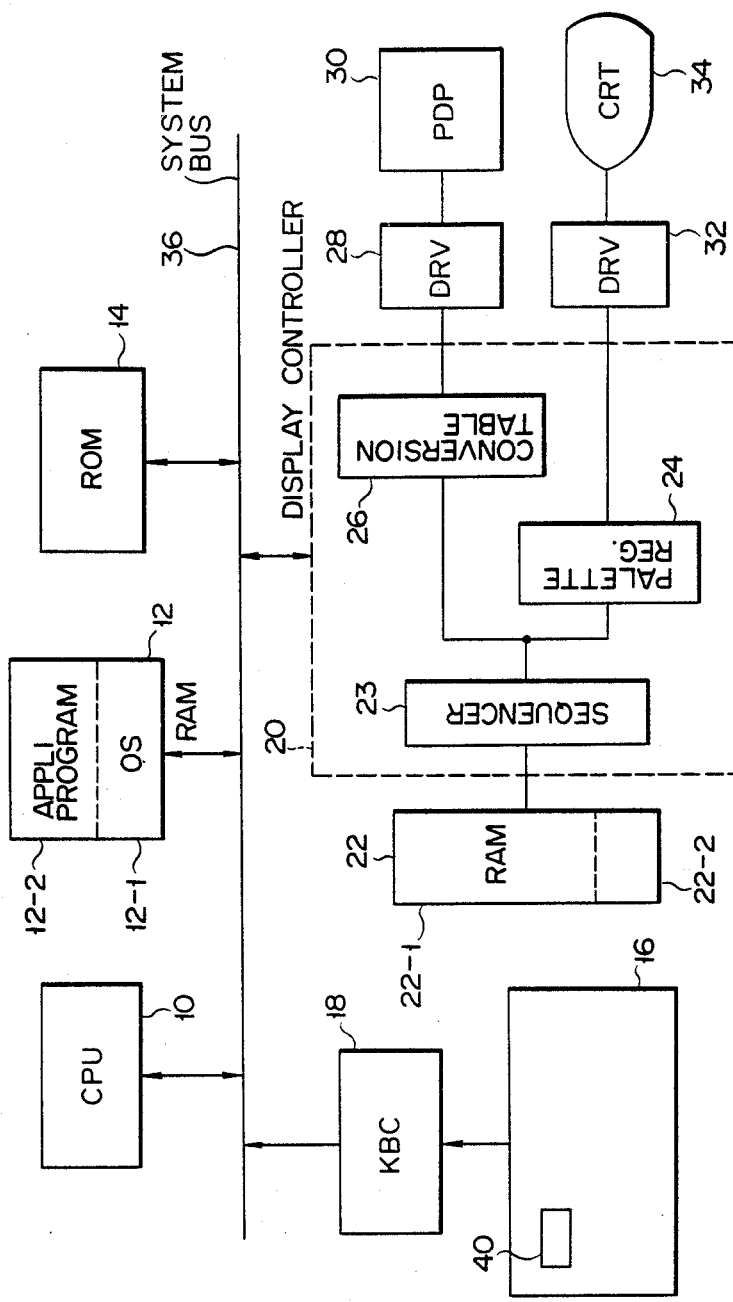
FIG. 1 is a block diagram showing an embodiment of the present invention.

Referring to FIG. 1, an arrangement of the apparatus according to an embodiment of the present invention will be described.

Figure 3:
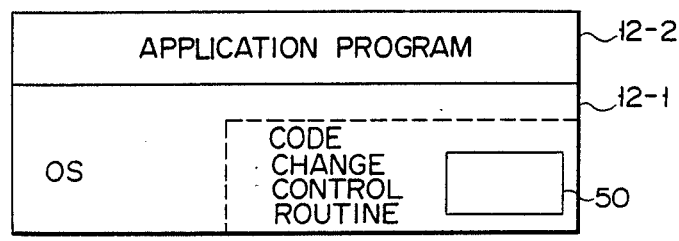
FIG. 3 is a schematic view describing a program stored in RAM 12 in FIG. 1.

In FIG. 1, microprocessor (CPU) 10, RAM 12 and ROM 14 are connected to system bus 36. CPU 10 controls an operation of the overall apparatus in accordance with programs stored in RAM 12 and ROM 14. As shown in FIG. 3, RAM 12 stores an operating system (OS) and an application program to be executed. In the OS, a code change control routine and relation table 50 are included. ROM 14 stores a BIOS for controlling data input/output from/to devices connected to bus 36. Keyboard 16 is connected to bus 36 through keyboard controller (KBC) 18. Keyboard 16 includes character keys (not shown) and code change start key 40. When code change start key 40 is pressed, a code change start instruction is generated and supplied to CPU 10 through KBC 18, thereby setting a code change mode.

Display controller 20 is connected to bus 36 and includes sequencer 23, palette register 24 and conversion table 26. Controller 20 stores display data supplied through bus 36 in memory 22. Memory 22 has area 22-1 for storing display data and buffer area 22-2 for temporarily storing a part of the display data. In a graphic display mode, the display data is stored with an attribute in memory 22 in units of pixels. The identical attribute is assigned to the pixels in one portion of the display data. In a text display mode, each character is stored with a set of an ASCII code and an attribute. An attribute representing a background color is also stored.

Palette register 24 has, for example, 16 palettes, each of which holds a color code representing one of 64 colors. As described above, display data has an attribute representing a palette to be designated from the 16 palettes of register 24. In order to display data, the display data is read out from memory 22 by sequencer 23 and supplied to register 24 and conversion table 26. In accordance with attributes of the supplied display data, register 24 generates and supplies a color code to driver 32. In accordance with the input color code, driver 32 displays the data on color CRT 34. In describing this embodiment, however, note that CRT 34 need not be connected.

Table 26 receives the same attribute of the display data as that supplied to register 24. Table 26 then converts the attributes of the display data to a gradation code, which is output to driver 28. In accordance with the input gradation code, driver 28 displays the data on plasma display panel (PDP) 30. PDP 30 can display data with four gradation levels.

Figure 2:
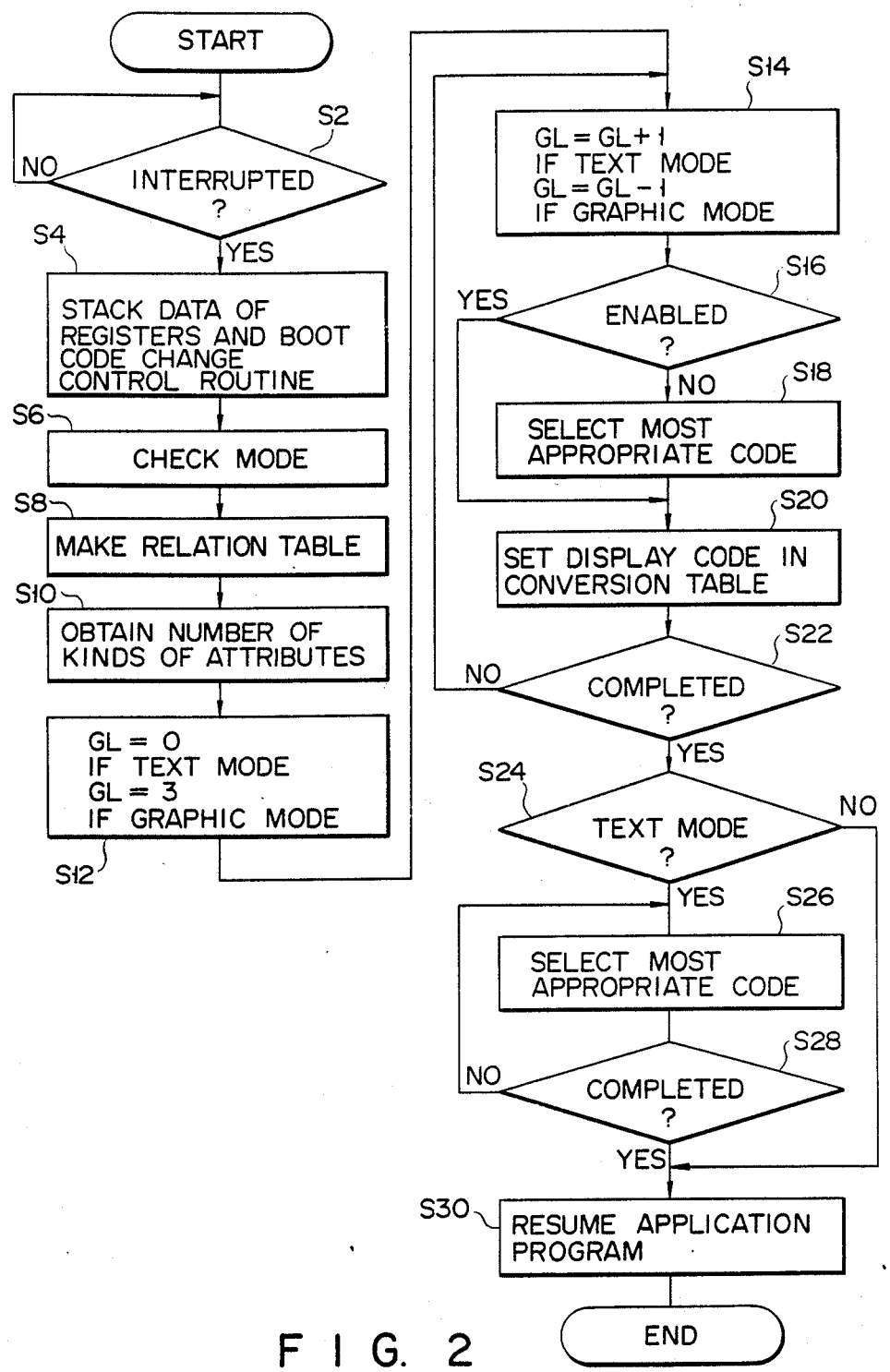
FIG. 2 is a flow chart for describing an operation of the embodiment.

An operation of the embodiment of the present invention will be described in detail below with reference to FIG. 2.

Figures 6A, 6B:
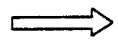
FIGS. 6A and 6B are views showing a change in a conversion table.

Assume that color codes are written in register 24 and gradation codes are written in table 26 as shown in FIG. 6A. Also, assume that an application program stored in area 12-2 of RAM 12 is currently executed and display data is stored in area 22-1 of RAM 22. This application program is developed for a color display device.

Figure 4A:
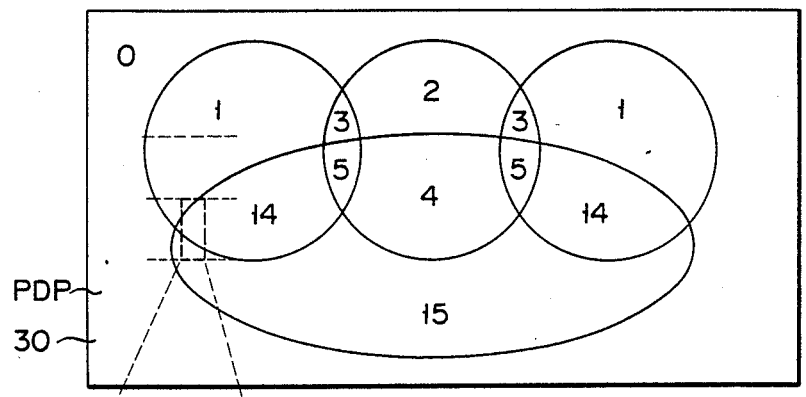
FIGS. 4A and 4B are views for describing an operation of the embodiment performed in order to obtain a relation between attributes of display data.

When data is displayed on PDP 30 as shown in FIG. 4A and the contents in table 26 are as shown in FIG. 6A, colors compete with each other and no color boundary can be recognized in portions having attributes represented in FIG. 4A by "1", "2" and "3", which correspond to gradation code "1", and those portions having attributes represented by "14" and "15", which correspond to gradation code "3". Assume that the sizes of areas shown in FIG. 4A, i.e., the number of pixels in each area, is such that the arrangement of the areas in the sequence "0", "15", "1", "14", "4", "2", "5" and "3" correspond to the identification of the largest area, to the smallest area, respectively. In this case, an operator can depress code change start key 40 on keyboard 16 to generate a code change start instruction. The generated instruction is output to CPU 10 through KBC 18. If CPU 10 determines that the code change start instruction is received, as indicated in step S2 of FIG. 2, it stacks the contents of its internal registers in step S4 and starts the code change control routine, stored in area 12-1 in the OS, as a normal interruption operation.

Figure 4B:
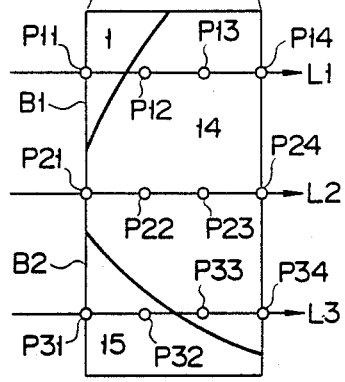

Upon start of the code change control routine, CPU 10 checks in step S6 whether the mode is a graphic mode or a text mode. In step S8, a relation between attributes is obtained from the display data if the graphic mode is set, or from background display data if the text mode is set. The display data stored in memory 22 are read out by sequencer 23 to check a relation between attributes of pixels of the display data. For example, in order to check a relation of an area shown in FIG. 4B, attributes of pixels P11 to P34 on lines L1, L2 and L3 in areas B1 and B2, each having the same size as that of a display area of one character, are read out to check the presence/absence of an attribute change. For example, an attribute change for pixel P22 is checked from pixels P11, P12, P13, P21, P23, P31, P32 and P33, and attribute changes from "1" to "14" and from "15" to "14" are detected. In this case, when the attribute changes are detected, data N1,14 and N14,15 in a relation table shown in FIG. 5 are incremented by one. In addition, size data M14 of "14" as an attribute of central pixel P22 is incremented by one. The above processing is performed for every two character area of the display data of one frame to make relation table 50 in the OS of RAM 12. In step S10, the number of kinds of the attributes used in detection of the relation is obtained from size data M1 to M15 of table 50.

An attribute having maximum size data is checked from size data M1 to M15 in step S12. In this example, attribute "0" is maximum. Therefore, it is determined that attribute "0" is the background display data in the graphic mode and display gradation code "0" is assigned to attribute "0". Parameter GL is set to "3" in the graphic mode and "0" in the text mode. Display gradation code "3" is assigned to attribute "15", which has the second largest size data. In step S14, the value of parameter GL is decremented by one in the graphic mode, so that GL="2". In the text mode, the value of parameter GL is incremented by one and as a result is set to be GL="1". In step S16, CPU 10 checks whether or not the currently-set display gradation code designated by parameter GL can be set in table 26. If in step S16 the determination is "Yes" (e.g., current value of parameter GL can be set in table 26), the value of parameter GL "2" in the graphic mode is written into table 26 as a display gradation code corresponding to currently-selected attribute "1" in step S20. Thereafter, step S22 is executed.

If in step S16 the determination is "No" (e.g., current value of parameter GL cannot be set in table 26), step S18 is executed. For example, if the current value of parameter GL corresponding to currently-selected attribute "4" is "3", "No" is determined in step S16 since gradation code "3" is already assigned to attribute "15", which is adjacent to attribute "4", as shown in FIG. 4A. In step S18, the more appropriate display gradation code "1" is selected from the relation table 26. A similar operation is performed as to the background display data.

Step S22 is then executed to check whether display gradation code assigning processing has been performed for all the attributes of the display data in the graphic mode or the background display data in the text mode. If "Yes" in step S22, step S24 is executed; if "No" in step S22, an attribute having the next largest size data is selected, and step S14 is executed again.

In step S24, CPU 10 checks whether the text mode is set. If "No" in step S24 (e.g., text mode is not set), step S30 is executed. If "Yes" in step S24 (e.g., text mode is set), step S26 is executed. In step S26, a display gradation code assigned to an attribute of first background display data is checked to determine the optimum contrast. As a result, the most appropriate display gradation code to be assigned to an attribute of first character display data in the first background display data is determined and written in table 26. For example, if the display gradation code assigned to the attribute of the first background display data is "1", then "3" is selected as the most appropriate gradation code for the first character display data; similarly, if the display gradation code is "0", "2" is assigned. In step S28, CPU 10 checks whether or not processing has been completely performed for all the character display data. If the processing is not complete so that step S28 determines a "No", step S26 is executed for the second character display data in second background display data. If "Yes" in step S28, the processing is complete and step S30 is executed.

In step S30, the contents of the internal registers of CPU 10 are recovered from the stack, and the application program is resumed from the interrupted step. At this time, since the contents in conversion table 26 have been changed, the data stored in memory 22 is displayed on PDP 30 in accordance with the changed contents of conversion table 26.

As has been described above, according to the present invention, a color display application program can be directly run, without changes, by a computer having a mono-color display device such as a PDP. In addition, since a gradation level can be appropriately selected, no color competition occurs and therefore discrimination between color boundaries is not interferred.

The present invention can be apparently applied not only to a change from a color code to a mono-color code but also to that between color codes. In addition, a method of obtaining the relation table and size data can be variously modified. For example, the number of points to be subjected to detection processing may be decreased to increase a processing speed. Also, a method of selecting the most appropriate code may be variously modified.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An apparatus for displaying display data without color competition, comprising:
    storage means for storing the display data, said display data having attributes assigned to portions of the display data in units of pixels;
    control means for determining in response to an input change instruction a relation between the display data portions and a corresponding size of an area of each display data portion, and for determining display code data in accordance with the relation and the sizes; and
    display means for reading out the display data from said storage means, and displaying the display data with representations determined in accordance with the display code data.

2. An apparatus according to claim 1, wherein said display means includes a conversion table for storing the display code data determined by said control means, and means for referring to said conversion table to convert the attributes of the display data to codes representing the representations.

3. An apparatus according to claim 1, further comprising:
    instruction generating means for generating and outputting to said control means the input change instruction, and wherein
    said control means includes:
    memory means for storing an application program and a code change program, the display data stored in said storage means being under the control of the application program; and
    processor means for executing the code change program in response to the input change instruction, and for executing the application program after the execution of the code change program.

4. An apparatus according to claim 3, wherein said processor means includes means for executing the code change program by interrupting the application program in response to the input change instruction and resuming the application program after the code change program is executed.

5. An apparatus according to claim 3, wherein the code change program is included in an operating system.

6. An apparatus according to claim 1, wherein said control means prevents adjacent display areas of corresponding data portions from having identical display code data.

7. A method of displaying display data without color competition, comprising the steps of:
    obtaining in response to a change instruction a relation between portions of the display data and a corresponding size of an area of each display data portion, each of the display data portions having an attribute in units of pixels;
    determining codes of display code data corresponding to the attributes of the display data portions in accordance with the relation and the corresponding sizes; and
    displaying the display data with colors determined in accordance with the codes.

8. A method according to claim 7, wherein said obtaining step includes obtaining the relation and the size from the attributes of pixels in each of a plurality of blocks, the plurality of blocks forming a first frame.

9. A method according to claim 7, further comprising checking whether a mode is a graphic mode or a text mode, said checking step occurring before said determining step.

10. A method according to claim 9, wherein said determining step includes determining the codes corresponding to the attributes of the display data portions sequentially from a first display data portion having a second largest area size to a second data portion having a smallest area size in accordance with the obtained relation in the graphic mode.

11. A method according to claim 9, wherein said determining step includes:
    determining sequentially the code corresponding to the attribute of a first display data portion to be background data of the display data, the first display data portion having a largest area size in accordance with the obtained relation in the text mode; and
    determining the code corresponding to the attribute of each character data of the display data in accordance with the determined code of the background data.

12. A method according to claim 7, wherein an application program controls the display data, said obtaining and said determining steps are executed in accordance with the code change program, and said displaying step is executed in accordance with the application program.

13. A method according to claim 12, wherein the application program is interrupted in response to the change instruction to execute the code change program, and the application program is resumed after the code change program is executed.

14. A method according to claim 13, wherein the code change program is included in an operating system.

15. A method according to claim 7, wherein said determining step prevents adjacent display areas of corresponding data portions from having identical display code data.

16. An apparatus for displaying display data without color competition comprising:
- storage means for storing the display data, the display data having portions, the portions of the display data having attributes representing colors to be displayed;
- means for checking whether a mode is a graphic mode or a text mode;
- means for obtaining a relation between the display data portions and sizes of areas of the display data portions in response to an input change instruction;
- means for determining a code corresponding to the attribute of each of the display data portions sequentially from a display data portion having a second largest area size in accordance with the relation in the graphic mode; and
- display means for displaying the display data in accordance with the determined codes.

17. An apparatus according to claim 16, wherein said obtaining means includes second means for obtaining the relation from attributes of pixels, the pixels forming a block, a plurality of the blocks forming a frame, the display data having the attribute for each pixel.

18. An apparatus according to claim 16, wherein said determining means further comprises:
- second means for sequentially determining the code corresponding to the attribute of a first display data portion to be background data of the display data, the display data portion having a largest area size in accordance with the obtained relation in the text mode; and
- means for determining the code corresponding to the attribute of character data of the display data in accordance with the determined code of the background data.

19. An apparatus according to claim 16, wherein a code change program controls said obtaining means and said determining means.

20. An apparatus according to claim 19, wherein the application program is interrupted in response to the change instruction to execute the code change program, and the application program is resumed after the code change program is executed.

21. An apparatus according to claim 20, wherein the code change program is included in an operating system.

22. An apparatus according to claim 16, wherein said determining means prevents adjacent display areas of corresponding data portions from having identical display code data.

* * * * *